(12) United States Patent
Biswas et al.

(10) Patent No.: US 12,091,352 B2
(45) Date of Patent: Sep. 17, 2024

(54) APPARATUS AND METHOD FOR MITIGATING ELECTROCHEMICAL ATTACK OF PRECIOUS METAL COMPONENTS IN A GLASS MAKING PROCESS

(71) Applicant: CORNING INCORPORATED, Corning, NY (US)

(72) Inventors: Samir Biswas, Charlotte, NC (US); Aaron Joshua Hade, Corning, NY (US); David Myron Lineman, Painted Post, NY (US); Steven Robert Moshier, Horseheads, NY (US); Nicholas Scott Ryan, Dublin, CA (US)

(73) Assignee: CORNING INCORPORATED, Corning, NY (US)

( * ) Notice: Subject to any disclaimer, the term of this patent is extended or adjusted under 35 U.S.C. 154(b) by 794 days.

(21) Appl. No.: 17/279,950

(22) PCT Filed: Sep. 20, 2019

(86) PCT No.: PCT/US2019/052062
§ 371 (c)(1),
(2) Date: Mar. 25, 2021

(87) PCT Pub. No.: WO2020/068567
PCT Pub. Date: Apr. 2, 2020

(65) Prior Publication Data
US 2021/0387887 A1   Dec. 16, 2021

Related U.S. Application Data

(60) Provisional application No. 62/738,138, filed on Sep. 28, 2018.

(51) Int. Cl.
*C03B 5/167*   (2006.01)
*C03B 5/027*   (2006.01)
(Continued)

(52) U.S. Cl.
CPC .............. *C03B 5/167* (2013.01); *C03B 5/027* (2013.01); *C03B 33/0235* (2013.01); *H05B 3/03* (2013.01)

(58) Field of Classification Search
CPC ...... C07H 21/00; C07H 21/04; C12N 15/111; C12N 15/113; C12N 2310/11;
(Continued)

(56) References Cited

U.S. PATENT DOCUMENTS

| 2,899,476 A | 8/1959 | Gell |
| 3,683,093 A | 8/1972 | Gell et al. |

(Continued)

FOREIGN PATENT DOCUMENTS

| CN | 2061563 U | 9/1990 |
| CN | 1297854 A | 6/2001 |

(Continued)

OTHER PUBLICATIONS

Translation of JP2012-162422A, "Method for manufacturing glass article and glass melting furnace", Aug. 3, 2012 (Year: 2012).*

(Continued)

*Primary Examiner* — Quang T Van
(74) *Attorney, Agent, or Firm* — Kevin M. Able

(57) ABSTRACT

Apparatus and methods are disclosed for forming a glass article in which molten glass is heated in a refractory vessel defining a space interior to the refractory vessel. A precious metal component is exposed to the interior space. The apparatus includes first and second electrodes exposed to the interior space. A first electrical power source configured to supply a first electrical current is connected between the first and second electrodes. A second electrical power source is connected between the precious metal component and at least one of the first electrode or a first auxiliary electrode and configured to provide a second electrical current out- (Continued)

of-phase with the first electrical current. A third electrical power source is connected between the precious metal component and at least one of the second electrode or a second auxiliary electrode and configured to provide a third electrical current out-of-phase with the first electrical current.

20 Claims, 7 Drawing Sheets

(51) Int. Cl.
  *C03B 33/023* (2006.01)
  *H05B 3/03* (2006.01)
(58) Field of Classification Search
  CPC .......... C12N 2310/113; C12N 2310/14; C12N 2310/315; C12N 2310/321; C12N 2310/3231; C12N 2310/341; C12N 2310/3533; C12N 2320/30; C03B 17/064; C03B 33/0235; C03B 5/027; C03B 5/167; C03B 5/193; C03B 7/02; C03B 17/06; C03B 18/02; H05B 3/03; H05B 3/60; H01B 1/02
  USPC ........ 373/18, 20, 22, 27, 28, 29, 37, 39, 41, 373/60, 72, 74, 76, 81, 84; 219/121.38, 219/121.34, 121.37, 121.43, 121.44; 430/108.1, 108.2, 108.21, 108.23, 108; 65/35, 121, 126, 134.7, 135.6, 135.9, 355
  See application file for complete search history.

(56) References Cited

U.S. PATENT DOCUMENTS

| | | | |
|---|---|---|---|
| 3,967,046 A | 6/1976 | Froberg et al. | |
| 4,410,997 A | 10/1983 | Gell et al. | |
| 4,607,372 A | 8/1986 | Martin et al. | |
| 4,638,490 A | 1/1987 | Dunn et al. | |
| 5,574,746 A | 11/1996 | Ammon et al. | |
| 6,629,437 B1 * | 10/2003 | Baucke | C03B 7/02 65/135.1 |
| 8,356,492 B2 | 1/2013 | Suzuki et al. | |
| 2006/0016222 A1 | 1/2006 | Pfeiffer et al. | |
| 2006/0144089 A1 * | 7/2006 | Eichholz | C03B 5/235 65/29.21 |
| 2011/0079047 A1 | 4/2011 | Suzuki et al. | |
| 2020/0262731 A1 | 8/2020 | Cook et al. | |

FOREIGN PATENT DOCUMENTS

| | | | |
|---|---|---|---|
| CN | 1721348 A | 1/2006 | |
| CN | 102031558 A | 4/2011 | |
| CN | 106396340 A | 2/2017 | |
| DE | 102010036627 A1 | 1/2012 | |
| JP | 2001-172024 A | 6/2001 | |
| JP | 2006-028014 A | 2/2006 | |
| JP | 2012-162422 A | 8/2012 | |
| JP | 2017-030987 A | 2/2017 | |
| KR | 10-2008-0011658 A | 2/2008 | |
| KR | 10-2013-0112065 A | 10/2013 | |
| KR | 10-2013-0113973 A | 10/2013 | |
| TW | 200616914 A | 6/2006 | |
| TW | 201829324 A | 8/2018 | |
| WO | 2018/089436 A1 | 5/2018 | |

OTHER PUBLICATIONS

Bolitz et al. "Electrochemical Corrosion of Molybdenum Electrodes in Soda-Lime Glass Containing Antimony" 18th Plansee Seminar, RM 26, 2013, 12 pages.
International Search Report and Written Opinion of the International Searching Authority; PCT/US2019/052066; Mailed on Jan. 20, 2020, 12 pages; European Patent Office.
International Search Report and Written Opinion of the International Searching Authority; PCT/US2019/052062; Mailed on Jan. 13, 2020, 10 pages; European Patent Office.
Chinese Patent Application No. 201980074699.7, Office Action, dated Jun. 28, 2022, 14 pages, (7 pages of English Translation and 7 pages of Original Copy); Chinese Patent Office.

* cited by examiner

APPARATUS AND METHOD FOR MITIGATING ELECTROCHEMICAL ATTACK OF PRECIOUS METAL COMPONENTS IN A GLASS MAKING PROCESS

CROSS-REFERENCE TO RELATED APPLICATIONS

This application is a national stage application under 35 U.S.C. § 371 of International Application No. PCT/US2019/052062, filed on Sep. 20, 2019, which claims the benefit of priority of U.S. Provisional Application Ser. No. 62/738,138 filed on Sep. 28, 2018 the contents of which are relied upon and incorporated herein by reference in their entirety.

BACKGROUND

Field

The present disclosure relates to apparatus and methods for forming a glass article, and more particularly apparatus and methods for mitigating electrochemical attack of precious metal components in a refractory vessel for producing the glass article.

Technical Background

In the commercial melting of glass, there are two primary means of inputting energy into the melting process: Convection and/or radiation of energy from the combustion of fossil fuels, and/or joule heating of the glass by establishing an electrical current between electrodes immersed therein. Electrical energy is preferred because of its higher efficiency, less environmental impact and process flexibility. However, batch (precursor) materials are generally non-conducting and therefore non-electrical methods can be used, either as an initial heating method, or a heat augmenting method. For example, in some methods, a combination of fossil fuel and electricity can be used as the sources of energy, wherein batch materials are initially heated by combustion burners to form an electrically conductive molten material, and then the molten material (hereinafter "molten glass") is further heated by an electrical current.

For most glasses using electrical current to heat the molten glass, electrodes are immersed in the molten glass along at least a portion of the melting vessel length near or in one or more refractory walls of the melting vessel. Typically, the electrodes are arranged so that electrodes along one side of the melting vessel have corresponding electrodes along the other side of the melting vessel to which they electrically "fire" (i.e., pass an electrical current) through the molten glass. For a given melting vessel, there can be multiple electrical circuits providing alternating electrical current across a length or width of the melting vessel. It was previously thought the electrical current in an electrical circuit traveled through the molten glass from one electrode and out of the melting vessel at the corresponding electrode on the opposite side of the melting vessel with little to no interaction with other components in the melting vessel. Recent experimental work has shown the electrical current extending across the melting vessel can also conduct through and interact with metal components in the melting vessel such as connecting conduits, thermocouple sheaths, bubbler tubes, taps or other metal components. Many of these metal components can be formed from a precious metal, for example platinum group metals or alloys thereof, to resist the high temperature and corrosive environment of the molten glass. Because these precious metals comprise a resistivity orders of magnitude lower than molten glass, a precious metal component in or near the voltage field between the electrodes can become an electrical current path. Accordingly, electrical current enters the precious metal component on a side of the precious metal component facing one of the electrodes in the electrical circuit and exits the precious metal component on the opposite side facing the opposing electrode in the electrical circuit. The magnitude of the electrical current in the precious metal component can be directly proportional to the electrical current applied to a given electrode circuit. Electrical current firing through precious metal can attack the precious metal and generate gases that form inclusions (seeds) in the molten glass. This precious metal attack can also produce solid inclusions as the precious metal component corrodes in the molten glass, as well as impairment and/or destruction of the precious metal component. As the glass industry moves to low and ultra-low resistivity glasses for electronic displays or other applications, precious metal attack is increasingly problematic because of the greater electrical current values needed to obtain an equivalent electrical power into the molten glass. Autopsies of precious metal conduits leading from melting vessels producing such glasses have shown measurable attack of the precious metal from this mechanism.

What is needed is a method of reducing electrical current through precious metal components that may be exposed to the molten glass in a melting vessel utilizing Joule heating, thereby reducing gaseous and/or particulate inclusions.

SUMMARY

In accordance with the present disclosure, an apparatus for forming a glass article is disclosed, comprising a refractory vessel defining an interior space configured to hold molten glass. The refractory vessel can be, for example, at least one of a melting vessel, a forehearth, or a fining vessel. The interior space may be, for example in the case of a melting vessel, a melting space wherein a molten material, e.g., molten glass, is produced from batch materials supplied to the melting space. Molten glass contained within the interior space can be heated, at least in part, by Joule heating, wherein an electrical current is passed through the molten glass.

The apparatus may further comprise a precious metal component exposed to the interior space and arranged to contact the molten glass. The precious metal component may comprise at least one of a thermocouple, a bubbler tube, or a conduit configured as a flow path for the molten glass.

The apparatus may still further comprise a first alternating current electrical power source electrically connected between first and second electrodes exposed to the interior space, for example a melting space, and arranged to contact the molten glass, the first alternating current electrical power source configured to supply a first electrical current. For example, at least a portion of the first electrical current extends between the first and second electrodes but does not extend through the precious metal component.

The apparatus may further comprise a second alternating current electrical power source electrically connected between the precious metal component and at least one of the first electrode or a first auxiliary electrode arranged to contact the molten glass, the second electrical power source configured to supply a second electrical current out-of-phase with the first electrical current. For example, the first auxiliary electrode can be positioned in the interior space so as to be in contact with, such as immersed in, molten glass when molten glass is present in the interior space. The first auxiliary electrode can be spaced apart from the first electrode.

For example, in some embodiments, when molten glass is present in the interior space, the second electrical current can extend through the molten glass between the precious metal component and the first electrode such that the second electrical current is present in the precious metal component. In other embodiments, when molten glass is present in the interior space, the second electrical current can extend through the molten glass between the precious metal component and the first auxiliary electrode. In still other embodiments, when molten glass is present in the interior space, the second electrical current can extend through the molten glass between the precious metal component and both first electrode and the first auxiliary electrode. That is, the second alternating current electrical power source can be electrically connected to both the first electrode and the first auxiliary electrode.

The apparatus may further comprise a third alternating current electrical power source electrically connected between the precious metal component and at least one of the second electrode or a second auxiliary electrode arranged to contact the molten glass, the second electrical power source configured to supply a third electrical current out-of-phase with the first electrical current. For example, the second auxiliary electrode can be positioned in the interior space so as to be in contact with, such as immersed in, molten glass when molten glass is present in the interior space. The second auxiliary electrode can be spaced apart from the first and second electrodes and the first auxiliary electrode.

For example, in some embodiments, when molten glass is present in the interior space, the third electrical current can extend through the molten glass between the precious metal component and the second electrode such that the third electrical current is present in the precious metal component. In other embodiments, when molten glass is present in the interior space, the third electrical current can extend through the molten glass between the precious metal component and the second auxiliary electrode. In still other embodiments, when molten glass is present in the interior space, the third electrical current can extend through the molten glass between the precious metal component and both second electrode and the second auxiliary electrode. That is, the third alternating current electrical power source can be electrically connected to both the second electrode and the second auxiliary electrode.

The first alternating current electrical power source, the first electrode, and the second electrode can comprise a first electrical circuit. Further, when molten glass is present in the interior space, the first electrical circuit can additionally comprise an electrical current path extending through the molten glass between the first and second electrodes, wherein the electrical current path does not include the precious metal component.

In embodiments, the first alternating current electrical power source, the first electrode, and the second electrode can comprise a second electrical circuit, wherein, when molten glass is present in the interior space, the second electrical circuit further comprises an electrical current path that includes the precious metal component. At least a second portion of the first electrical current traverses the electrical current path between the first and second electrodes and the precious metal component.

In various embodiments, the second alternating current electrical power source, the precious metal component, and the at least one of the first electrode or the first auxiliary electrode can comprise a first electrical biasing circuit. Further, when molten glass is present in the interior space, the first electrical biasing circuit can additionally comprise one or more electrical current paths extending through the molten glass between the precious metal component and the first electrode, between the precious metal component and the first auxiliary electrode, or between the precious metal component and both the first electrode and the first auxiliary electrode.

In various embodiments, the third alternating current electrical power source, the precious metal component, and the at least one of the second electrode or the second auxiliary electrode can comprise a second electrical biasing circuit. Further, when molten glass is present in the interior space, the second electrical biasing circuit can additionally comprise one or more electrical current paths extending through the molten glass between the precious metal component and the second electrode, between the precious metal component and the second auxiliary electrode, or between the precious metal component and both the second electrode and the second auxiliary electrode.

In some embodiments, any one or more of the first and/or second electrodes can comprise tin or molybdenum.

In some embodiments, any one or more of the first and/or second auxiliary electrodes can comprise tin or molybdenum.

In some embodiments, at least one of the first or second alternating current electrical power sources can be configured such that an absolute value of a phase difference between the first electrical current and the second electrical current is in a range from about 90 degrees to about 180 degrees.

In some embodiments, at least one of the first or third alternating current electrical power sources can be configured such that an absolute value of a phase difference between the first electrical current and the third electrical current is in a range from about 90 degrees to about 180 degrees.

In other embodiments, methods for forming a glass article are disclosed, comprising supplying a first electrical current from a first alternating current electrical power source, a first portion of the first electrical current extending along a first electrical current path between a first electrode and a second electrode in a melting space of a melting vessel, the melting space comprising molten glass and a precious metal component in contact with the molten glass, the first electrical current path extending through the molten glass and not the precious metal component, and a second portion of the first electrical current extending along a second electrical current path between the first electrode and the second electrode in the melting space of the melting vessel, the second electrical current path extending through the molten glass and the precious metal component.

The method may further comprise supplying a second electrical current out-of-phase with the first electrical current from a second alternating current electrical power source, the second electrical current extending between at least one of the first electrode or a first auxiliary electrode in contact with the molten glass and spaced apart from the first electrode, and the precious metal component. For example, in some embodiments, when molten glass is present in the interior space, the second electrical current can extend through the molten glass between the precious metal component and the first electrode such that the second electrical current is present in the precious metal component. In other embodiments, when molten glass is present in the interior space, the second electrical current can extend through the molten glass between the precious metal component and the first auxiliary electrode. In still other embodiments, when molten glass is present in the interior space, the second electrical current can extend through the molten glass between the precious metal component and both first electrode and the first auxiliary electrode. That is, the second alternating current electrical power source can be electrically connected to both the first electrode and the first auxiliary electrode.

In some embodiments, an absolute value of a phase difference between the first electrical current and the second electrical current can be in a range from about 90 degrees to about 180 degrees.

In some embodiments, a magnitude of the second electrical current in the precious metal component can be in a range from about 50% to about 100% of a magnitude of the second portion of the first electrical current in the precious metal component.

The methods may still further comprise supplying a third electrical current out-of-phase with the first electrical current from a third alternating current electrical power source, the third electrical current extending between at least one of the second electrode or a second auxiliary electrode in contact with the molten glass and spaced apart from the second electrode, and the precious metal component.

For example, in some embodiments, when molten glass is present in the interior space, the third electrical current can extend through the molten glass between the precious metal component and the second electrode such that the third electrical current is present in the precious metal component. In other embodiments, when molten glass is present in the interior space, the third electrical current can extend through the molten glass between the precious metal component and the second auxiliary electrode. In still other embodiments, when molten glass is present in the interior space, the third electrical current can extend through the molten glass between the precious metal component and both second electrode and the second auxiliary electrode. That is, the third alternating current electrical power source can be electrically connected to both the second electrode and the second auxiliary electrode.

In some embodiments, an absolute value of a phase difference between the first electrical current and the third electrical current can be in a range from about 90 degrees to about 180 degrees.

In some embodiments, the third electrical current can be in-phase with the second electrical current (a phase difference of 0 degrees).

In some embodiments, a magnitude of the third electrical current in the precious metal component can be in a range from about 50% to about 100% of a magnitude of the second portion of the first electrical current in the precious metal component.

In some embodiments, a magnitude of the second electrical current in the precious metal component can be substantially equal to a magnitude of the third electrical current in the precious metal component.

In various embodiments, the precious metal component can comprise platinum. For example, the precious metal component an include a platinum alloy, such as a platinum-rhodium alloy.

In various embodiments, the precious metal component can comprise at least one of a thermocouple, a bubbler tube, or a conduit configured as a flow path for the molten glass.

The methods may further comprise drawing the molten glass from a forming body to produce the glass article. For example, in some embodiments, the glass article can comprise a glass ribbon.

Additional features and advantages of the embodiments disclosed herein will be set forth in the detailed description that follows, and in part will be clear to those skilled in the art from that description or recognized by practicing the embodiments described herein, including the detailed description which follows, the claims, as well as the appended drawings.

It is to be understood that both the foregoing general description and the following detailed description present embodiments intended to provide an overview or framework for understanding the nature and character of the embodiments disclosed herein. The accompanying drawings are included to provide further understanding, and are incorporated into and constitute a part of this specification. The drawings illustrate various embodiments of the disclosure, and together with the description explain the principles and operations thereof.

DETAILED DESCRIPTION

Figure 1:
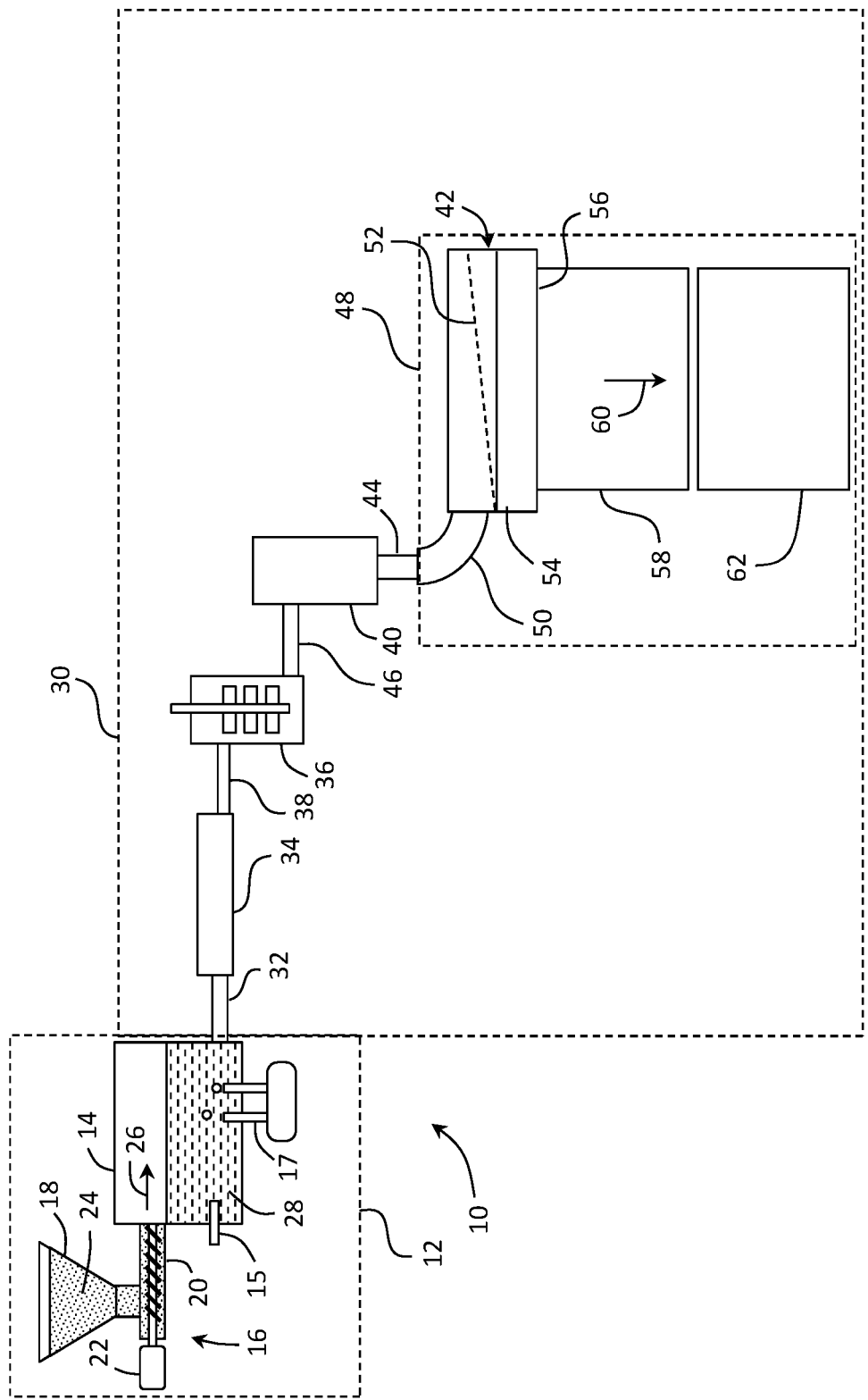
FIG. 1 is a schematic view of an exemplary glass manufacturing apparatus according to embodiments of the present disclosure.

Reference will now be made in detail to embodiments of the present disclosure, examples of which are illustrated in the accompanying drawings. Whenever possible, the same reference numerals will be used throughout the drawings to refer to the same or like parts. However, this disclosure may be embodied in many different forms and should not be construed as limited to the embodiments set forth herein.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art.

Ranges can be expressed herein as from "about" one particular value, and/or to "about" another particular value. When such a range is expressed, another embodiment includes from the one particular value to the other particular value. Similarly, when values are expressed as approximations by use of the antecedent "about," it will be understood that the particular value forms another embodiment. It will be further understood that the endpoints of each of the ranges are significant both in relation to the other endpoint, and independently of the other endpoint.

Directional terms as used herein—for example up, down, right, left, front, back, top, bottom—are made only with reference to the figures as drawn and are not intended to imply absolute orientation.

Unless otherwise expressly stated, it is in no way intended that any method set forth herein be construed as requiring that its steps be performed in a specific order, nor that with any apparatus, specific orientations be required. Accordingly, where a method claim does not actually recite an order to be followed by its steps, or that any apparatus claim does not actually recite an order or orientation to individual components, or it is not otherwise specifically stated in the claims or description that the steps are to be limited to a specific order, or that a specific order or orientation to components of an apparatus is not recited, it is in no way intended that an order or orientation be inferred in any respect. This holds for any possible non-express basis for interpretation, including: matters of logic with respect to arrangement of steps, operational flow, order of components, or orientation of components; plain meaning derived from grammatical organization or punctuation, and; the number or type of embodiments described in the specification.

As used herein, the singular forms "a," "an" and "the" include plural references unless the context clearly dictates otherwise. Thus, for example, reference to "a" component includes aspects having two or more such components, unless the context clearly indicates otherwise.

The word "exemplary," "example," or various forms thereof are used herein to mean serving as an example, instance, or illustration. Any aspect or design described herein as "exemplary" or as an "example" should not be construed as preferred or advantageous over other aspects or designs. Furthermore, examples are provided solely for purposes of clarity and understanding and are not meant to limit or restrict the disclosed subject matter or relevant portions of this disclosure in any manner. It can be appreciated that a myriad of additional or alternate examples of varying scope could have been presented but have been omitted for purposes of brevity.

As used herein, the terms "comprising" and "including", and variations thereof, shall be construed as synonymous and open-ended, unless otherwise indicated. A list of elements following the transitional phrases comprising or including is a non-exclusive list, such that elements in addition to those specifically recited in the list may also be present.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

As used herein, "refractory" refers to non-metallic materials having chemical and physical properties making them applicable for structures, or as components of systems, that are exposed to environments above 538° C.

Shown in FIG. 1 is an exemplary glass manufacturing apparatus 10. In some embodiments, the glass manufacturing apparatus 10 can comprise a glass melting furnace 12 including a melting vessel 14. In addition to melting vessel 14, glass melting furnace 12 can optionally include one or more additional components such as heating elements (e.g., combustion burners and/or electrodes) configured to heat raw material and convert the raw material into molten glass. For example, melting vessel 14 may be an electrically-boosted melting vessel, wherein energy is added to the raw material through both combustion burners and by direct heating, wherein an electrical current is passed through the raw material, the electrical current thereby adding energy via Joule heating of the raw material. In some embodiments, melting furnace 12 may include a forehearth (not shown) arranged to provide thermal conditioning to molten glass leaving melting vessel 14.

In further embodiments, glass melting furnace 12 can include thermal management devices (e.g., insulation components) that reduce heat loss from the melting vessel. In still further embodiments, glass melting furnace 12 can include electronic and/or electromechanical devices that facilitate melting of the raw material into a glass melt. For example, glass melting furnace 12, and more specifically glass melting vessel 14, may include one or more thermocouples 15 that relay a temperature signal to temperature control apparatus. Typically, such thermocouples penetrating one or more walls of the melting vessel (for example side walls or the bottom wall of the melting vessel) into the molten glass comprise platinum or a platinum alloy such as a platinum or platinum alloy sheath, to protect the thermocouple from corrosive effects of the molten glass. Still further, glass melting furnace 12 can include support structures (e.g., support chassis, support member, etc.) or other components. In some embodiments, melting vessel 14 may further include one or more bubbler tubes 17 in fluid communication with a source of gas, for example an inert gas such as nitrogen or one or more of the noble gases, or oxygen, or a combination of any of these gases, or any other suitable gas. Typically, such bubbler tubes comprise platinum or a platinum alloy such as, but not limited to, a platinum—rhodium alloy, and extend through the bottom wall of the melting vessel. Bubbling gas into the molten glass can assist with mixing the molten glass, adjusting a redox state of the molten glass, or may even assist with fining the molten glass by forming a bubble that other gasses in the molten glass can diffuse into.

Glass melting vessel 14 can be formed from a refractory material, such as a refractory ceramic material, for example a refractory ceramic material comprising alumina or zirconia, although the refractory ceramic material can comprise other refractory materials, such as yttrium (e.g., yttria, yttria-stabilized zirconia, yttrium phosphate), zircon (Zr-SiO$_4$) or alumina-zirconia-silica or even chrome oxide, used either alternatively or in any combination. In some examples, glass melting vessel 14 may be constructed from refractory ceramic bricks.

In some embodiments, melting furnace 12 can be incorporated as a component of a glass manufacturing apparatus configured to fabricate a glass article, for example a glass ribbon of an indeterminate length, although in further embodiments, the glass manufacturing apparatus can be configured to form other glass articles without limitation, such as glass rods, glass tubes, glass envelopes (for example, glass envelopes for lighting devices, e.g., light bulbs) and glass lenses, although many other glass articles are contemplated. In some examples, the melting furnace may be included in a glass manufacturing apparatus comprising a slot draw apparatus, a float bath apparatus, a down-draw apparatus (e.g., a fusion down draw apparatus), an up-draw apparatus, a pressing apparatus, a rolling apparatus, a tube drawing apparatus or any other glass manufacturing apparatus that would benefit from the present disclosure. By way of example, FIG. 1 schematically illustrates glass melting furnace 12 as a component of a fusion down-draw glass manufacturing apparatus 10 for fusion drawing a glass ribbon for subsequent processing into individual glass sheets or rolling the glass ribbon onto a spool.

Glass manufacturing apparatus 10 can optionally include an upstream glass manufacturing apparatus 16 positioned upstream of glass melting vessel 14. In some examples, a portion of, or the entire upstream glass manufacturing apparatus 16, can be incorporated as part of the glass melting furnace 12.

As shown in the embodiment illustrated in FIG. 1, upstream glass manufacturing apparatus 16 can include a raw material storage bin 18, a raw material delivery device 20 and a motor 22 connected to raw material delivery device 20. Raw material storage bin 18 can be configured to store a quantity of raw material 24 that can be fed into melting vessel 14 of glass melting furnace 12 through one or more feed ports, as indicated by arrow 26. Raw material 24 typically comprises one or more glass forming metal oxides and one or more modifying agents. In some examples, raw material delivery device 20 can be powered by motor 22 to deliver a predetermined amount of raw material 24 from storage bin 18 to melting vessel 14. In further examples, motor 22 can power raw material delivery device 20 to introduce raw material 24 at a controlled rate based on a level of molten glass sensed downstream from melting vessel 14 relative to a flow direction of the molten glass. Raw material 24 within melting vessel 14 can thereafter be heated to form molten glass 28. Typically, in an initial melting step, raw material is added to the melting vessel as particulate, for example as various "sands". Raw material 24 can also include scrap glass (i.e. cullet) from previous melting and/or forming operations. Combustion burners are typically used to begin the melting process. In an electrically boosted melting process, once the electrical resistance of the raw material is sufficiently reduced, electric boost can begin by developing an electrical potential between electrodes positioned in contact with the raw material, thereby establishing an electrical current through the raw material, the raw material typically entering, or in, a molten state.

Glass manufacturing apparatus 10 can also optionally include a downstream glass manufacturing apparatus 30 positioned downstream of glass melting furnace 12 relative to a flow direction of molten glass 28. In some examples, a portion of downstream glass manufacturing apparatus 30 may be incorporated as part of glass melting furnace 12. However, in some instances, first connecting conduit 32 discussed below, or other portions of the downstream glass manufacturing apparatus 30, can be incorporated as part of the glass melting furnace 12.

Downstream glass manufacturing apparatus 30 can include a first conditioning (i.e. processing) chamber, such as fining vessel 34, located downstream from melting vessel 14 and coupled to melting vessel 14 by way of the above-referenced first connecting conduit 32. In some examples, molten glass 28 may be gravity fed from melting vessel 14 to fining vessel 34 by way of first connecting conduit 32. For instance, gravity may drive molten glass 28 through an interior pathway of first connecting conduit 32 from melting vessel 14 to fining vessel 34. Accordingly, first connecting conduit 32 provides a flow path for molten glass 28 from melting vessel 14 to fining vessel 34. It should be understood, however, that other conditioning chambers may be positioned downstream of melting vessel 14, for example between melting vessel 14 and fining vessel 34. In some embodiments, a conditioning chamber can be employed between the melting vessel and the fining chamber. For example, molten glass from a primary melting vessel can be further heated in a secondary melting (conditioning) vessel or cooled in the secondary melting vessel to a temperature lower than the temperature of the molten glass in the primary melting vessel before entering the fining chamber.

As described previously, bubbles may be removed from molten glass 28 by various techniques. For example, raw material 24 may include multivalent compounds (i.e. fining agents) such as tin oxide that, when heated, undergo a chemical reduction reaction and release oxygen. Other suitable fining agents include without limitation arsenic, antimony, iron and cerium, although the use of arsenic and antimony may be discouraged for environmental reasons in some applications. Fining vessel 34 is heated, for example to a temperature greater than the melting vessel temperature, thereby heating the fining agent. Oxygen bubbles produced by the temperature-induced chemical reduction of one or more fining agents included in the molten glass rise through the molten glass within the fining vessel, wherein gases in the molten glass produced in the melting furnace can coalesce or diffuse into the oxygen bubbles produced by the fining agent. The enlarged gas bubbles with increased buoyancy can then rise to a free surface of the molten glass within the fining vessel and thereafter be vented out of the fining vessel. The oxygen bubbles can further induce mechanical mixing of the molten glass in the fining vessel as they rise through the molten glass.

The downstream glass manufacturing apparatus 30 can further include another conditioning chamber, such as mixing apparatus 36, for example a stirring chamber, for mixing the molten glass that flows downstream from fining vessel 34. Mixing apparatus 36 can be used to provide a homogenous glass melt composition, thereby reducing chemical or thermal inhomogeneities that may otherwise exist within the molten glass exiting the fining chamber. As shown, fining vessel 34 may be coupled to mixing apparatus 36 by way of a second connecting conduit 38. In some embodiments, molten glass 28 can be gravity fed from the fining vessel 34 to mixing apparatus 36 by way of second connecting conduit 38. For instance, gravity may drive molten glass 28 through an interior pathway of second connecting conduit 38 from fining vessel 34 to mixing apparatus 36. Typically, the molten glass within mixing apparatus 36 includes a free surface, with a free volume extending between the free surface and a top of the mixing apparatus. It should be noted that while mixing apparatus 36 is shown downstream of fining vessel 34 relative to a flow direction of the molten glass, mixing apparatus 36 may be positioned upstream from fining vessel 34 in other embodiments. In some embodiments, downstream glass manufacturing apparatus 30 may include multiple mixing apparatus, for example a mixing apparatus upstream from fining vessel 34 and a mixing apparatus downstream from fining vessel 34. These multiple mixing apparatus may be of the same design, or they may be of a different design from one another. In some embodiments, one or more of the vessels and/or conduits can include static mixing vanes positioned therein promote mixing and subsequent homogenization of the molten material.

Downstream glass manufacturing apparatus 30 can further include another conditioning chamber such as delivery vessel 40 located downstream from mixing apparatus 36. Delivery chamber 40 can condition molten glass 28 to be fed into a downstream forming device. For instance, delivery chamber 40 can act as an accumulator and/or flow controller to adjust and provide a consistent flow of molten glass 28 to forming body 42 by way of exit conduit 44. The molten glass within delivery chamber 40 can, in some embodiments, include a free surface, wherein a free volume extends upward from the free surface to a top of the delivery chamber. As shown, mixing apparatus 36 can be coupled to delivery chamber 40 by way of third connecting conduit 46. In some examples, molten glass 28 can be gravity fed from mixing apparatus 36 to delivery vessel 40 by way of third connecting conduit 46. For instance, gravity can drive molten glass 28 through an interior pathway of third connecting conduit 46 from mixing apparatus 36 to delivery chamber 40.

Downstream glass manufacturing apparatus 30 can further include forming apparatus 48 comprising the above-referenced forming body 42, including inlet conduit 50. Exit conduit 44 can be positioned to deliver molten glass 28 from delivery vessel 40 to inlet conduit 50 of forming apparatus 48. Forming body 42 in a fusion down-draw glass making apparatus can comprise a trough 52 positioned in an upper surface of the forming body, and converging forming surfaces 54 (only one surface shown) that converge in a draw direction along a bottom edge (root) 56 of the forming body. Molten glass delivered to forming body trough 52 via delivery vessel 40, exit conduit 44 and inlet conduit 50 overflows the walls of trough 52 and descends along the converging forming surfaces 54 as separate flows of molten glass. The separate flows of molten glass join below and along the root 56 to produce a single ribbon 58 of molten glass that is drawn along a draw plane in a draw direction 60 from root 56 by applying a downward tension to the glass ribbon, such as by gravity and/or pulling roll assemblies (not shown), to control the dimensions of the glass ribbon as the molten glass cools and a viscosity of the material increases. Accordingly, glass ribbon 58 goes through a visco-elastic transition an elastic state and acquires mechanical properties that give glass ribbon 58 stable dimensional characteristics. Glass ribbon 58 may in some embodiments be separated into individual glass sheets 62 by a glass separation apparatus (not shown), while in further embodiments, the glass ribbon may be wound onto spools and stored for further processing.

Components of downstream glass manufacturing apparatus 30, including any one or more of connecting conduits 32, 38, 46, fining vessel 34, mixing apparatus 36, delivery vessel 40, exit conduit 44, or inlet conduit 50 may be formed from a precious metal. Suitable precious metals include platinum group metals selected from the group consisting of platinum, iridium, rhodium, osmium, ruthenium and palladium, or alloys thereof. For example, downstream components of the glass manufacturing apparatus may be formed from a platinum-rhodium alloy including from about 70% to about 90% by weight platinum and about 10% to about 30% by weight rhodium. However, other suitable metals for forming downstream components of the glass manufacturing apparatus can include molybdenum, rhenium, tantalum, titanium, tungsten and alloys thereof. In other embodiments, certain components can be formed with a refractory material. For example, in some embodiments, fining vessel 34 may be a refractory fining vessel.

Although elements of the glass making apparatus 10 are shown and described as fusion downdraw glass making elements, principles of the present disclosure can be applied to a wide variety of glass making processes. For example, melting vessels according to embodiments of the present disclosure can be used in such diverse glass making processes as fusion processes, slot draw processes, rolling processes, pressing processes, float processes, tube drawing processes, and so forth.

Figure 2:
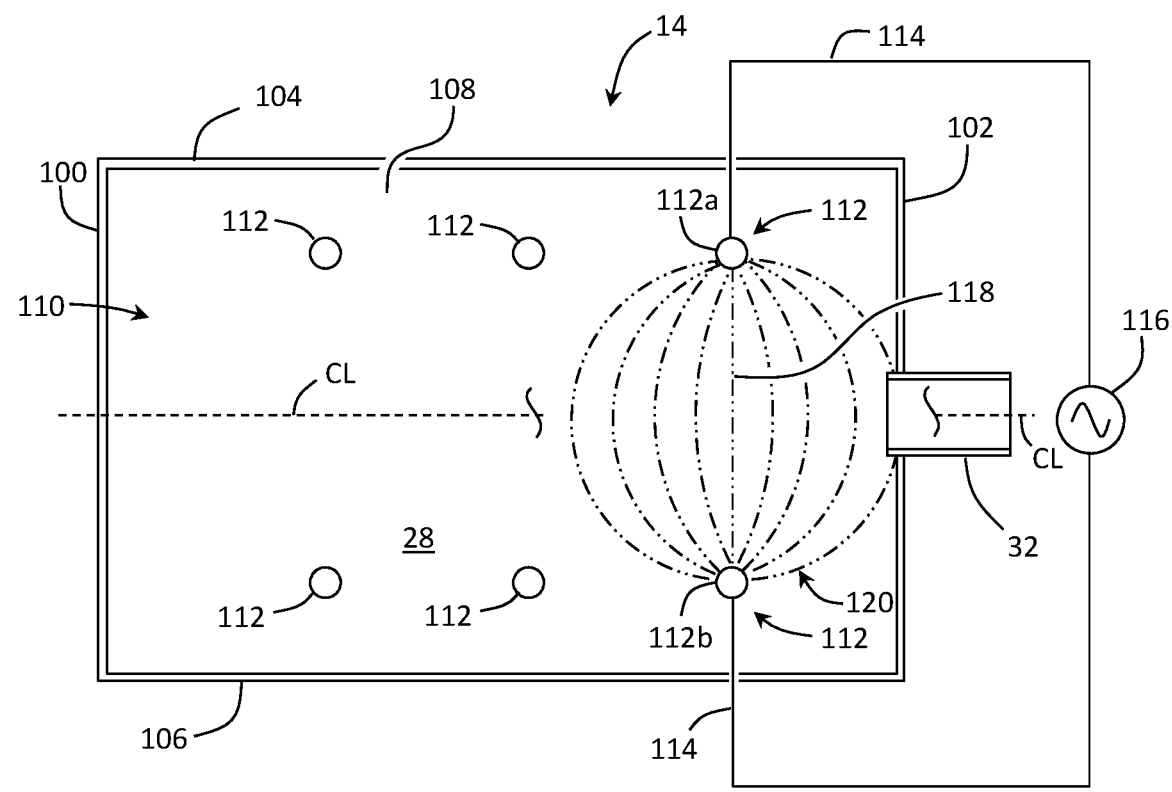
FIG. 2 is a plan view of an exemplary melting vessel that can be used in the apparatus of FIG. 1, illustrating electrical current paths through molten glass contained in the melting vessel and which electrical current paths extend between electrodes.

Turning to FIG. 2, a plan view of an exemplary refractory melting vessel 14 is shown (not to scale). In some embodiments, the refractory melting vessel walls can be arranged in the shape of a polygon with a polygonal footprint, for example a rectangle as shown in FIG. 2, although in further embodiments, the refractory melting vessel may form a circular, elliptical, or other curved footprint. For discussion and not limitation, the exemplary melting vessel 14 of FIG. 2, with a rectangular footprint, will be described in more detail below, with the understanding that the following description can be equally applicable to other melting vessel shapes.

As shown in FIG. 2, exemplary melting vessel 14 can comprise back wall 100, front wall 102, first and second side walls 104, 106, and bottom wall (e.g., floor) 108. In various embodiments, a ceiling can extend between the back, front and sidewalls and over the bottom wall. The back wall, front wall, side walls and bottom wall define an interior space 110, for example a melting space, for processing batch material 24 into molten material 28 (hereinafter, molten glass). Batch materials can enter the melting space through one or more openings in the back wall, and molten glass can leave the refractory melting vessel through one or more openings in the front wall. For example, melting vessel 14 may further comprise first connecting conduit 32 extending through front wall 102 and configured to convey molten glass 28 from melting space 110 to a downstream process. Melting vessel 14 may still further comprise a plurality of electrodes 112 extending through bottom wall 108 into melting space 110, although in further embodiments, the plurality of electrodes 112 can be exposed to, and in some embodiments, extend into, melting space 110 through first and second side walls 104, 106. The plurality of electrodes 112 can comprise, for example, molybdenum (e.g., Mo or $MoZrO_2$) or tin (e.g., tin oxide), and can be formed as rods, blocks, plates, or other suitable shapes, depending on placement and operation.

The plurality of electrodes 112 can be connected to one or more electrical power sources, forming one or more electrical circuits for establishing an electrical current through molten glass 28. For example, the plurality of electrodes 112 can be arranged as pairs of electrodes in a predetermined electrical circuit, wherein one electrode of the pair of electrodes in the predetermined electrical circuit can be positioned on one side of melting vessel 14 and the other electrode of the pair of electrodes in the predetermined circuit can be positioned on the opposite side of melting vessel 14, e.g., alongside or positioned in first and second side walls 104, 106. For example, in various embodiments, the plurality of electrodes 112 may be arranged in a first row of electrodes extending along (e.g., parallel to) and spaced apart from first side wall 104 on one side of melting vessel centerline CL, and a second row of electrodes extending along and spaced apart from second side wall 106 on the other side of melting vessel centerline CL. However, the plurality of electrodes can be configured in other arrangements, wherein a predetermined electrical circuit can comprise more than two electrodes, for example three electrodes, four electrodes, or more than four electrodes. An electrical power source connected to the electrodes in a predetermined electrical circuit, for example a pair of electrodes, for example one electrode of the electrode pair positioned on one side of centerline CL and the other electrode of the electrode pair positioned on the other side of centerline CL, establishes an electrical current in the molten glass between the electrodes by forming an electrical potential (voltage) between the pair of electrodes. When powered by the electrical power source, the electrical circuit is said to "fire" across the molten glass (e.g., across the centerline CL) between the pair of electrodes (e.g., an electrical current is established between the opposing electrodes). Multiple such electrical circuits, including two or more electrodes each, can be established in the melting vessel. One such exemplary electrical circuit is shown in FIG. 2, wherein a pair of electrodes 112a and 112b closest to connecting conduit 32 are supplied with an electrical current through one or more electrical conductors 114 (e.g., cables, buss bars, etc.) by alternating current electrical power source 116. An electrical current can be established through molten glass 28 between first and second electrodes 112a and 112b which, owing to the electrical resistance of the molten glass, generates heat within molten glass 28. Alternating current electrical power source 116 can comprise a line power provided to a glass manufacturing facility by a public utility, although in further embodiments, the alternating current electrical power source can be provided by an on-site generator.

In various embodiments, the plurality of electrodes 112 can be positioned in electrode holders (not shown) that provide for movement of the electrodes. For example, over time the electrodes can be reduced in length due to erosion, corrosion, and dissolution in the hot molten glass. Accordingly, from time to time the electrodes may need to be "pushed", thereby extending the length of the electrode exposed to the molten glass to a predetermined value. The electrode holders may further provide cooling of the electrode. Cooling of the electrodes can, for example, increase the longevity of the electrodes. In addition, in some embodiments, a gap between an electrode holder and the electrode can fill with molten glass. Cooling increases a viscosity of the molten glass in the gap, thereby forming a glass seal that can preventing leakage of molten glass from the melting vessel through the gap and can further form effective electrical isolation between the electrode and the refractory wall through which the electrode passes. The electrode can be moved (e.g., "pushed"), by reducing cooling so the glass in the gap becomes molten again (viscosity reduced), moving the electrode, then increasing the cooling to reform the glass seal in the gap.

There are many possible current paths between first and second electrodes 112a and 112b within the three-dimensional melting space 110, some of which are shown and represented by the several dashed and double-dotted lines extending between first and second electrodes 112a and 112b. For purposes of discussion and not limitation, electrical current paths extending entirely through molten glass 28 between first and second electrodes 112a and 112b will be represented in the figures by the straight-line electrical current path 118 (first electrical current path 118) between first and second electrodes 112a and 112b. Likewise, there are other electrical current paths extending between first and second electrodes 112a and 112b that intersect with, and extend through, other conductors in the molten glass. As described herein, these other conductors can be metallic conductors, including precious metal components such as conduits, bubbler tubes, thermocouple components, etc. Such electrical current paths intersecting precious metal components in contact with the molten glass are represented in the figures by second electrical current path 120.

As shown in FIG. 2, second electrical current path 120 extending between first and second electrodes 112a and 112b can further extend through at least a portion of a precious metal component. For the purpose of discussion and not limitation, first connecting conduit 32 will be described in reference to and representative of a precious metal component. For example, first connecting conduit 32 can be representative of other precious metal components such as but not limited to thermocouples 15 and/or bubbler tubes 17.

The electrical current in first and second electrodes 112a and 112b is divided between first electrical current path 118 and second electrical current path 120 according to the individual electrical resistances of the electrical current paths, since first electrical current path 118 and second electrical current path 120 represent parallel electrical current paths. For example, if the electrical resistance of the first electrical current path is R1 and the electrical resistance of the parallel second electrical current path is R2, and i1 represents the total electrical current (e.g., the total electrical current in either one of the electrodes 112a or 112b), i1a represents the electrical current in the first electrical current path 118 and i1b represents the electrical current in the second electrical current path 120, then $i1a=(R2/(R1+R2))\cdot i1$ and $i1b=(R1/(R1+R2))\cdot i1$.

As described above, in various embodiments, first connecting conduit 32 can comprise a precious metal, for example platinum or a platinum alloy such as a platinum-rhodium alloy. While generally electrically conductive at a melting temperature of the molten glass, molten glass 28 occupying melting space 110 can still exhibit a substantially greater electrical resistance than first connecting conduit 32. Thus, the electrical current extending through first connecting conduit 32 can be significant, and if the electrical current in first connecting conduit 32 comprises sufficient magnitude (e.g., comprises a significantly large current density), electrochemical attack on first connecting conduit 32 can occur, thereby potentially releasing gas into the molten glass, or causing more substantial material breakdown of the conduit metal that can release metallic particles into the molten glass. For example, electrical current densities as low as 1 ampere per square inch (0.16 ampere per square cm) of surface area firing through precious metal can attack the precious metal and generate gases that form inclusions (seeds) in the molten glass.

To mitigate this division of electrical current between an electrode-to-electrode electrical current path (first electrical current path 118), and an electrode-metallic component-electrode electrical current path (e.g., second electrical current path 120), electrical biasing circuits can be provided to minimize or cancel out electrical current in the precious metal component, e.g., first connecting conduit 32, thermocouples 15 and/or bubbler tubes 17.

Figure 3:
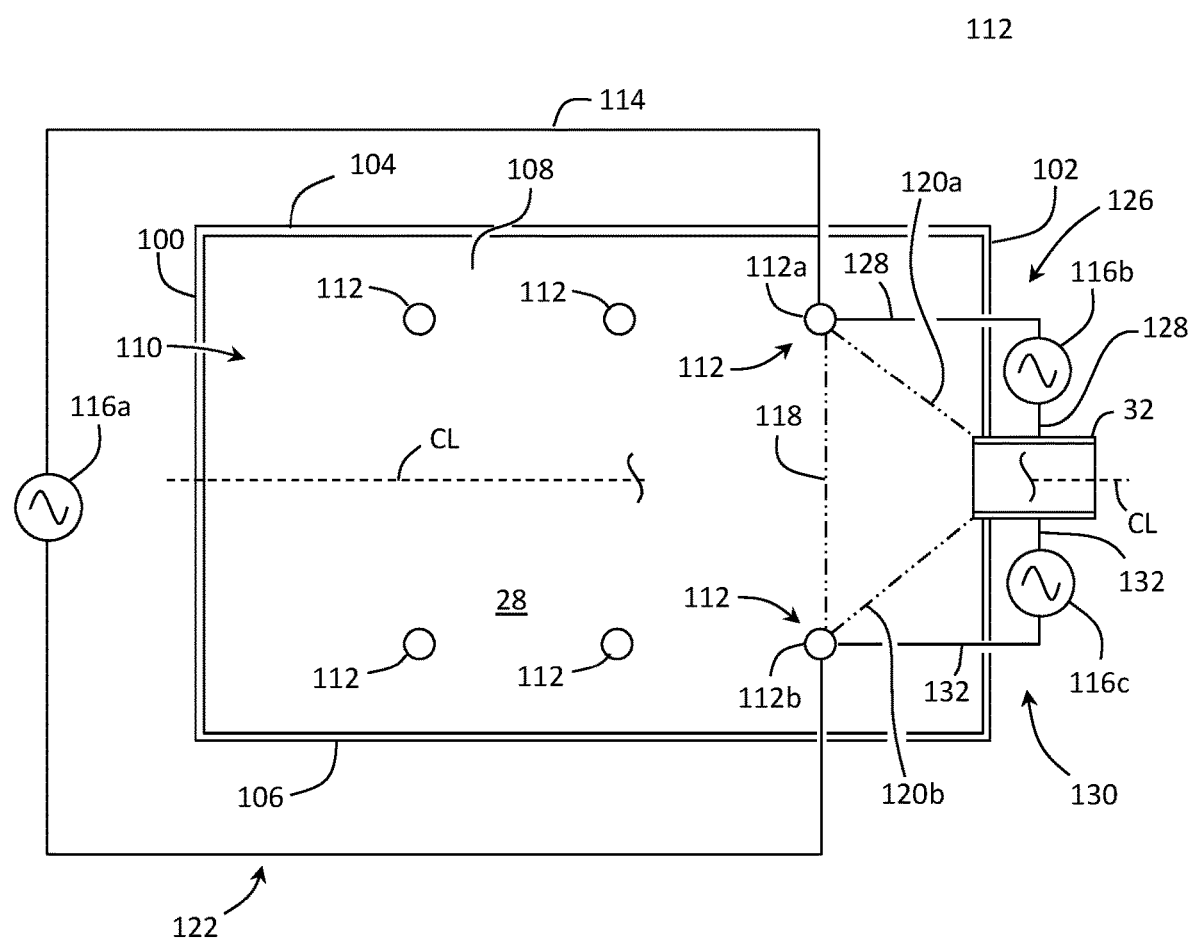
FIG. 3 is a plan view of another exemplary melting vessel that can be used in the apparatus of FIG. 1, illustrating electrical biasing circuits arranged between electrodes and a precious metal component.

Accordingly, FIG. 3 depicts another embodiment of melting vessel 14 comprising first electrical heating circuit 122 including first electrode 112a, second electrode 112b, first alternating current electrical power source 116a, first electrical current path 118 extending through molten glass 28 between first and second electrodes 112a, 112b, and one or more electrical conductors 114 (e.g., wiring, bus bars, etc.). First alternating current electrical power source 116a is electrically connected between first and second electrodes 112a, 112b by one or more electrical conductors 114. In the context of the electrical power sources described herein, the phrases "electrically connected," "electrically connecting," or variations thereof, denote a physical conducting path formed by electrical conductors not including molten glass, but which can include one or more other components. Typically, such electrical conductors comprise metallic wiring or cabling, buss bars, and the like, but are not limited thereto. The electrical connection between first and second electrodes 112a and 112b can include first alternating current electrical power source 116a, one or more electrical conductors 114, and may further include other components, including but not limited to electrical connectors (e.g., plugs, tabs, lugs, bolts, etc.) that facilitate connection between components, electrical control devices such as electrical current and/or voltage controllers, electrical current and/or voltage measurement devices, and the like.

FIG. 3 further depicts first and second electrical biasing circuits 126 and 130, which will be discussed in further detail below.

Figure 4:
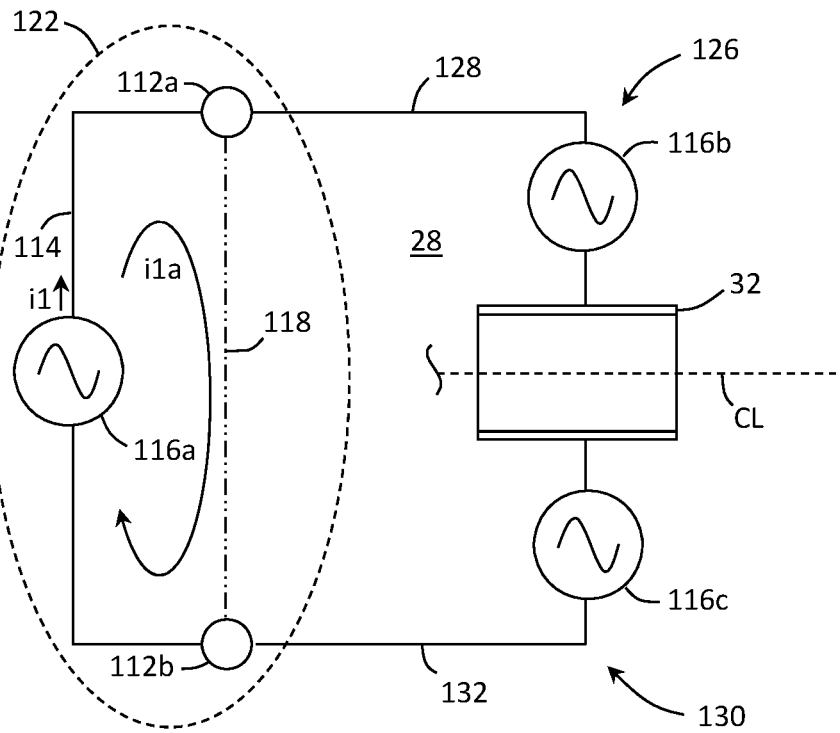
FIG. 4 is an electrical schematic depicting an electrical current in a first electrical current path of FIG. 3.

FIG. 4 is an electrical schematic view of a portion of FIG. 3 with the melting vessel walls eliminated for clarity. FIG. 4 highlights electrical heating circuit 122 (encompassed by the dashed ellipse). In accordance with various embodiments, first alternating current electrical power source 116a can provide first electrical current i1 in the form, $$i1 = i1\max \cdot \sin(\omega t + \phi 1), \quad (5)$$

wherein i1max represents the maximum value of the electrical current i1 provided by first alternating current electrical power source 116a, ω represents the angular frequency of the electrical current provided by first alternating current electrical power source 116a in radians/second and indicates the rate of change of the electrical current magnitude, t represents time in seconds, and ϕ1 represents the phase difference in radians of the electrical current provided by first alternating current electrical power source 116a relative to a reference electrical current, hereinafter phase angle. In this instance, electrical current i1 as used herein, for purposes of discussion and not limitation, will represent the reference electrical current, and therefore phase angle ϕ1 of electrical current i1 supplied by first alternating current electrical power source 116a is zero. A first portion i1a of electrical current i1 extends between first electrode 112a and second electrode 112b through molten glass 28 along first electrical current path 118 and does not extend into first connecting conduit 32. First alternating current electrical power source 116a can comprise a line electrical power supplied to a glass manufacturing facility by a public utility, although in further embodiments, first alternating current electrical power source 116a can comprise an on-site generator. First alternating current electrical power source 116a can, in various embodiments, include a transformer. And in still other embodiments, first alternating current electrical power source 116a may further include one or more thyristors for electrical power management.

Figure 5:
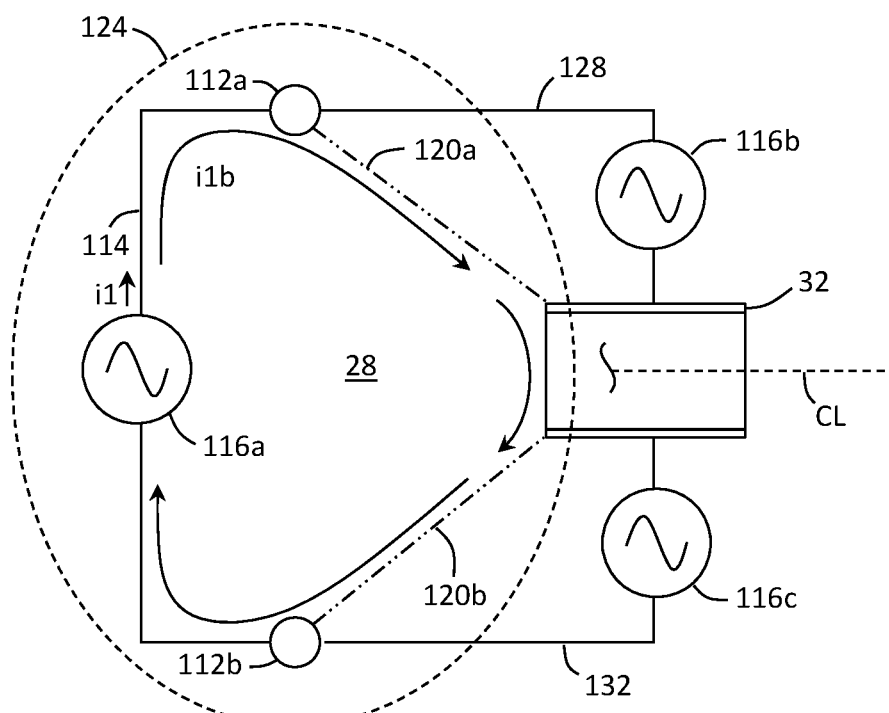
FIG. 5 is an electrical schematic depicting an electrical current in a second electrical current path of FIG. 3.

FIG. 5 is another electrical schematic view similar to FIG. 4 and illustrates a second electrical circuit 124 comprising first alternating current electrical power source 116a, first electrode 112a, second electrode 112b, first connecting conduit 32, second electrical current path 120 (comprising first electrical current path portion 120a extending through molten glass 28 between first electrode 112a and first connecting conduit 32, and second electrical current path portion 120b extending through molten glass 28 between first connecting conduit 32 and second electrode 112b, and one or more electrical conductors 114 (e.g., wiring, bus bars, etc.) electrically connecting first alternating current electrical power source 116a to first electrode 112a and second electrode 112b such that first alternating current electrical power source 116a is electrically connected between first and second electrodes 112a and 112b. Accordingly, a second portion i1b of electrical current i1 provided by first alternating current electrical power source 116a extends along first electrical current path portion 120a, first connecting conduit 32, and second electrical current path portion 120b. It should be clear that i1 comprises i1a+i1b and that first electrical current portion i1a and second electrical current portion i1b exhibit the same waveform parameters as i1. That is, both i1a and i1b comprise the form sin(ωt+ϕ1), where ϕ1=0.

Figure 6:
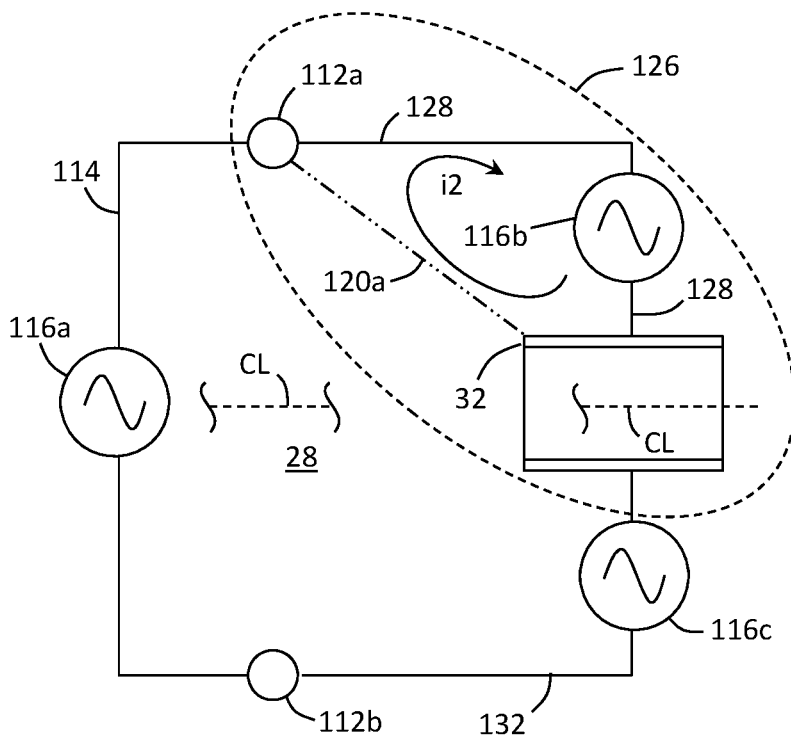
FIG. 6 is an electrical schematic depicting an electrical current in a first electrical biasing circuit of FIG. 3.

Turning to FIG. 6, melting vessel 14 may further comprise first electrical biasing circuit 126 comprising first electrode 112a, first connecting conduit 32, second alternating current electrical power source 116b, first electrical current path portion 120a extending through molten glass 28 between first electrode 112a and connecting conduit 32, and one or more electrical conductors 128 (e.g., wiring, bus bars, etc.) such that second alternating current electrical power source 116b is electrically connected between first electrode 112a and connecting conduit 32 by one or more electrical conductors 128. The electrical connection between first electrode 112a and connecting conduit 32, including the one or more electrical conductors 128, may further include other components, including but not limited to electrical connectors (e.g., plugs, tabs, lugs, bolts, insulators, etc.) that facilitate connection between components, electrical control devices such as for example electrical current and/or voltage controllers, electrical current and/or voltage measurement devices, and the like.

Second alternating current electrical power source 116b may supply a second alternating electrical current i2 in the form, $$i2 = i2\max \cdot \sin(\omega t + \phi 2), \quad (5)$$

where i2max represents the maximum value of the electrical current provided by second alternating current electrical power source 116b, ω represents angular frequency in radians/second, t represents time in seconds, and ϕ2 represents the phase angle of second electrical current i2 relative to first electrical current i1. The phase angle ϕ2 can be non-zero such that i2 is out-of-phase with i1. For example, in some embodiments, the absolute value of ϕ2 can be equal to or substantially equal to 180 degrees. That is, in some embodiments, the absolute value of a phase difference between the electrical current i2 supplied by second alternating current electrical power source 116b and electrical current i1 provided by first alternating current electrical power source 116a can be equal to or substantially equal to 180 degrees.

Second alternating current electrical power source 116b can comprise a line electrical power supplied to a glass manufacturing facility by a public utility, although in further embodiments, second alternating current electrical power source 116b can comprise an on-site generator. Second alternating current electrical power source 116b can, in various embodiments, include a transformer. And in still other embodiments, second alternating current electrical power source 116b may further include one or more thyristors for electrical power management. In some embodiments, second alternating current electrical power source 116b can comprise a phase converter.

Figure 7:
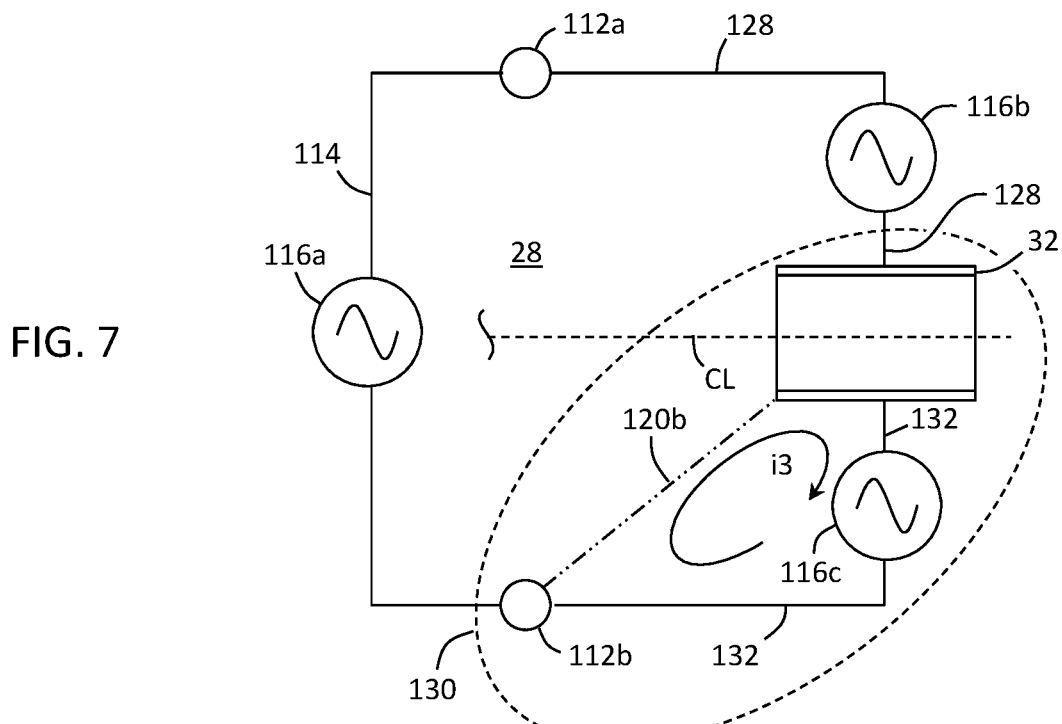
FIG. 7 is an electrical schematic depicting an electrical current in a second electrical biasing circuit of FIG. 3.

Referring now to FIG. 7, melting vessel 14 may still further comprise a second electrical biasing circuit 130 comprising second electrode 112b, third alternating current electrical power source 116c, first connecting conduit 32, second electrical current path portion 120b extending through molten glass 28 between connecting conduit 32 and second electrode 112b, and one or more electrical conductors 132 electrically connecting third alternating current electrical power source 116c to second electrode 112b and first connecting conduit 32 such that third alternating current electrical power source 116c is electrically connected between second electrode 112b and connecting conduit 32. The electrical connection between first electrode 112a and connecting conduit 32, including the one or more electrical conductors 128, may further include other components, including but not limited to electrical connectors (e.g., plugs, tabs, lugs, bolts, insulators, etc.) that facilitate connection between components, electrical control devices, such as electrical current and/or voltage controllers, electrical current and/or voltage measurement devices, and the like.

Third alternating current electrical power source 116c may provide a third alternating electrical current i3 in the form, $$i3 = i3\max \cdot \sin(\omega t + \phi 3), \quad (5)$$

where i3max represents the maximum value of the current i3 provided by third alternating current electrical power source 116c, ω represents angular frequency in radians/second, t represents time in seconds, and φ3 represents the phase angle of i3 relative to i1. The phase angle φ3 can be non-zero such that i3 is out-of-phase with i1. For example, in some embodiments, the absolute value of φ3 can be equal to or substantially equal to 180 degrees. That is, in some embodiments, the absolute value of a phase difference between the electrical current i3 supplied by third alternating current electrical power source 116c and the electrical current i1 provided by first alternating current electrical power source 116a can be equal to or substantially equal to 180 degrees.

Third alternating current electrical power source 116c can comprise a line electrical power supplied to a glass manufacturing facility by a public utility, although in further embodiments, third alternating current electrical power source 116c can comprise an on-site generator. Third alternating current electrical power source 116c can, in various embodiments, include a transformer. And in still other embodiments, third alternating current electrical power source 116c may further include one or more thyristors for electrical power management. In some embodiments, third alternating current electrical power source 116c can comprise a phase converter.

Figure 8:
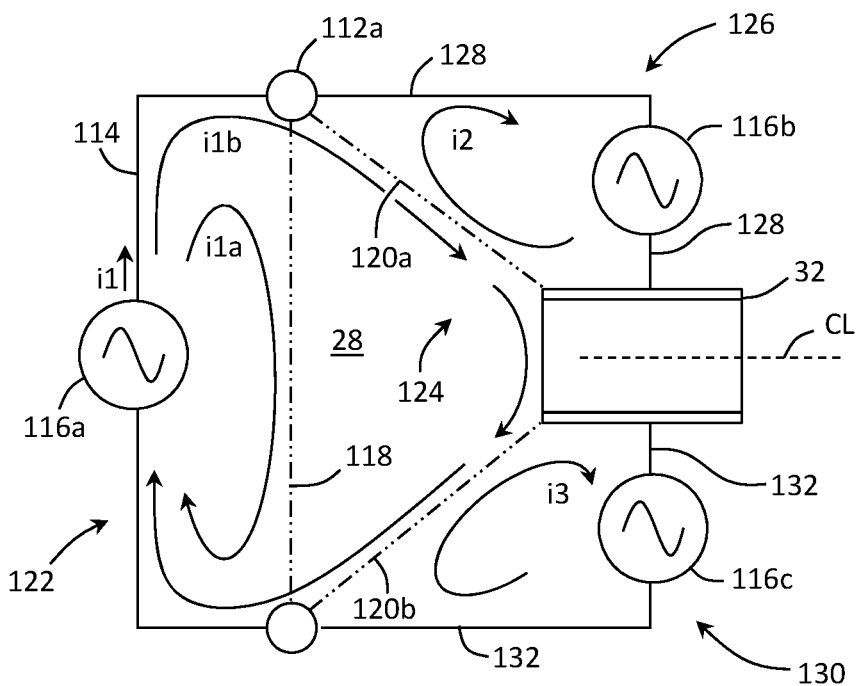
FIG. 8 is an electrical schematic illustrating the electrical currents shown separately in FIGS. 4-7.

FIG. 8 is an electrical schematic illustrating electrical currents i1 (including i1a and i1b), i2, and i3, and the paths of the electrical currents in the electrical circuits 122, 124, 126, and 130. The electrical currents i1a, i1b, i2 and i3 are represented as current loops circulating around their respective electrical circuits.

Figure 9:
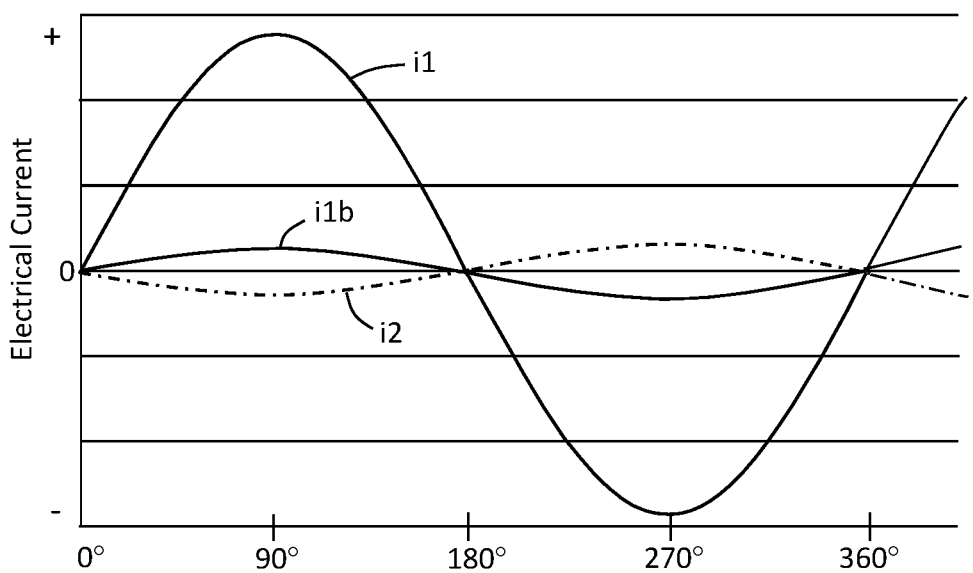
FIG. 9 is a plot illustrating a waveform representing a total electrical current in at least one of the electrodes of FIG. 2, a waveform representing an electrical current extending from a first electrode and through a precious metal component exposed to the molten glass, and a waveform representing an electrical current in the first electrical biasing circuit.

FIG. 9 is a plot exemplifying an effect of the first and second electrical biasing circuits 126 and 130, and illustrates a single cycle of alternating electrical currents i1, i1b (extending through first electrical current path portion 120a of second electrical circuit 124) and i2 circulating in first electrical biasing circuit 126 (including first electrical current path portion 120a). FIG. 9 illustrates that the electrical current i1b extending between first electrode 112a and connecting conduit 32 can be a small fraction of the total electrical current i1 in first electrode 112a, but in the present example, in-phase with electrical current i1. On the other hand, electrical current i2 in first electrical biasing circuit 126 can be out-of-phase with electrical current i1b, shown in FIG. 9 as 180 degrees out-of-phase, but, again in the present example, substantially equal in magnitude, effectively cancelling electrical current i1b in at least a portion of first connecting conduit 32, thereby minimizing, for example eliminating, electrochemical attack of first connecting conduit 32.

However, it should be noted that total cancellation of i1b may, in some embodiments, not be necessary. For example, it may be sufficient that the magnitude of the resultant electrical current in the precious metal component be reduced below a threshold for significant electrochemical activity. Accordingly, a sufficient reduction in i1b may be accomplished with an electrical biasing current (e.g., i2 and/or i3) with an absolute value that is other than 180 degrees out-of-phase. That is, in some embodiments, i2 and/or i3 can be configured to cancel at least a portion of the electrical current i1b in the precious metal component, e.g., connecting conduit 32. For example, in some embodiments, an absolute value of the phase difference between i2 and i1b can be in a range from about 90 degrees to about 180 degrees, such as in a range from about 100 degrees to about 180 degrees, from about 110 degrees to about 180 degrees, from about 120 degrees to about 180 degrees, from about 130 degrees to about 180 degrees, from about 140 degrees to about 150 degrees, from about 150 degrees to about 180 degrees, from about 160 degrees to about 180 degrees, or from about 170 degrees to about 180 degrees, including all ranges and subranges therebetween. Similarly, an absolute value of the phase difference between i3 and i1b can be in a range from about 90 degrees to about 180 degrees, such as in a range from about 100 degrees to about 180 degrees, from about 110 degrees to about 180 degrees, from about 120 degrees to about 180 degrees, from about 130 degrees to about 180 degrees, from about 140 degrees to about 150 degrees, from about 150 degrees to about 180 degrees, from about 160 degrees to about 180 degrees, or from about 170 degrees to about 180 degrees, including all ranges and subranges therebetween.

Moreover, the magnitude of electrical current i2 and/or i3 need not be equal in magnitude to the electrical current i1b extending through connecting conduit 32. For example, the magnitude of electrical current i2 and/or i3 in connecting conduit 32 need only be sufficient eliminate electrochemical attack of the precious metal component. For example, in some embodiments, a magnitude of i2 and/or i3 can be in a range from about 50% of i1b to about 100% of i1b, such as in a range from about 50% to about 95%, in a range from about 50% to about 90%, in a range from about 50% to about 85%, in a range from about 50% to about 80%, in a range from about 50% to about 70%, or in a range from about 50% to about 60%. In still other embodiments, a magnitude of i2 and/or i3 can be in a range from about 60% to about 100% of i1b, for example in a range from about 70% to about 100%, in a range from about 80% to about 100%, in a range from about 85% to about 100%, in a range from about 90% to about 100%, or in a range from about 95% to about 100%.

As noted above, second electrical circuit 124 and first electrical biasing circuit 126 can share a common electrical current path, e.g., first electrode 112a, first electrical current path portion 120a, and at least a portion of connecting conduit 32, just as second electrical circuit 124 and second electrical biasing circuit 130 can share a common electrical current path, e.g., second electrode 112b, second electrical current path portion 120b and at least a portion of connecting conduit 32. Accordingly, it should be evident that second electrical biasing circuit 130 would show similar results relative to second electrical circuit 124 as first electrical biasing circuit 126. Accordingly, first and second electrical biasing circuits can reduce or eliminate electrochemical attack of a precious metal component by reducing or eliminating the electrical current that facilitates the attack.

Figure 10:
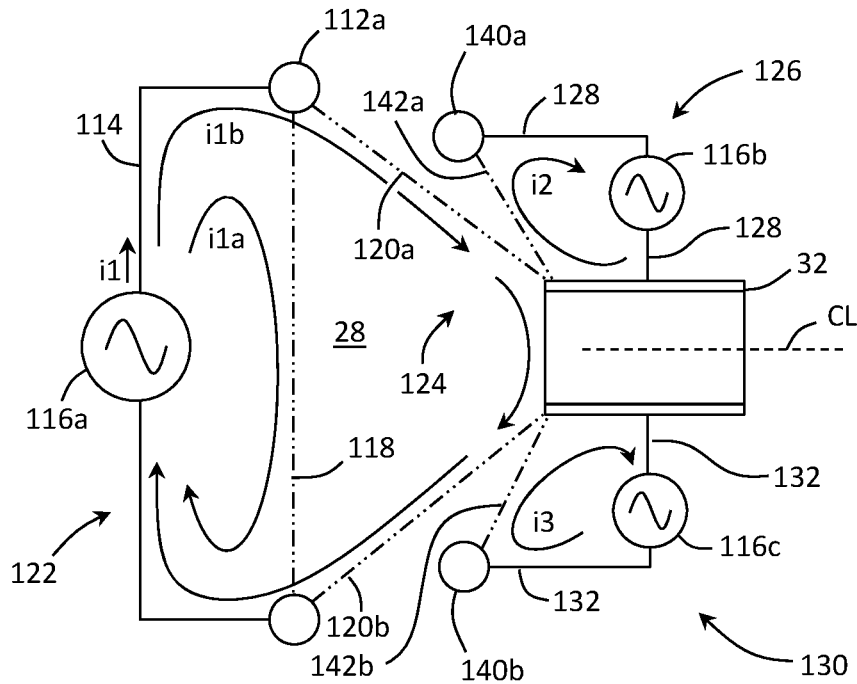
FIG. 10 is an electrical schematic illustrating an alternative embodiment wherein second and third alternating current electrical power sources are electrically connected to auxiliary electrodes.

FIG. 10 illustrates still other embodiments wherein the first and second electrical biasing circuits do not include first and second electrodes 112a and 112b. Instead, melting vessel 14 further comprises a first auxiliary electrode 140a and a second auxiliary electrode 140b, wherein first auxiliary electrode 140a is positioned on one side of centerline CL and second auxiliary electrode 140b is positioned on the opposite side of centerline C. In various embodiments, first and second auxiliary electrodes 140a, 140b can be nearer to connecting conduit 32 than first and second electrodes 112a and 112b, respectively. First auxiliary electrode 140a and second auxiliary electrode 140b are exposed to melting space 110 and molten glass 28. For example, first and second auxiliary electrodes 140a and 140b can be the same style electrodes as electrodes 112 (e.g., first and second electrodes 112a, 112b). That is, if electrodes 112 are rod-type electrodes extending upward from bottom wall 108 of melting vessel 14, first and second auxiliary electrodes 140a and 140b can also be rod-type electrodes extending upward from bottom wall 108. However, first and second auxiliary electrodes 140a and 140b need not be the same style electrodes as electrodes 112. For example, in some embodiments, first and second auxiliary electrodes 140a and 140b can be positioned in the side walls of melting vessel 14 when the plurality of electrodes 112 extend from bottom wall 108 of melting vessel 14, while in other embodiments, first and second auxiliary electrodes 140a and 140b can extend from bottom wall 108 of melting vessel 14 while the plurality of electrodes 112 are positioned in the side walls (e.g., first and second side walls 104, 106) of melting vessel 14. The material comprising first and second auxiliary electrodes 140a and 140b need not be the same as the material comprising the plurality of electrodes 112. For example, while the plurality of electrodes 112 may comprise tin, first and second auxiliary electrodes 140a and 140b may comprise molybdenum. On the other hand, while the plurality of electrodes 112 may comprise molybdenum, first and second auxiliary electrodes 140a and 140b may comprise tin. In still further embodiments, the material comprising the plurality of electrodes 112 can be the same material comprising first and second auxiliary electrodes 140a and 140b.

Similar to the plurality of electrodes 112, first and second auxiliary electrodes 140a, 140b can be held by suitable electrode holders that can provide for movement of the auxiliary electrodes if needed, cooling of the auxiliary electrodes, and electrical isolation of the auxiliary electrodes from the wall of the refractory melting vessel through which the auxiliary electrode passes.

In various embodiments, second alternating current electrical power source 116b can be electrically connected between first auxiliary electrode 140a and connecting conduit 32, such as by one or more electrical conductors 128, wherein first electrical biasing circuit 126 can comprise first auxiliary electrode 140a, connecting conduit 32, one or more electrical conductors electrically connecting first auxiliary electrode 140a and connecting conduit 32, and an electrical current path 142a extending through molten glass 28 between first auxiliary electrode 140a and connecting conduit 32.

In various embodiments, third alternating current electrical power source 116c can be electrically connected between second auxiliary electrode 140b and connecting conduit 32, such as by one or more electrical conductors 132, wherein second electrical biasing circuit 130 can comprise second auxiliary electrode 140b, connecting conduit 32, one or more electrical conductors 132 electrically connecting second auxiliary electrode 140b and connecting conduit 32, and an electrical current path 142b extending through molten glass 28 between second auxiliary electrode 140b and connecting conduit 32.

Second alternating current electrical power source 116b supplies alternating current i2 to first electrical biasing circuit 126. Third alternating current electrical power source 116c supplies electrical current i3 to second electrical biasing circuit 130. As before, electrical current i2 can be out-of-phase with electrical current i1. For example, a phase difference between i1 (e.g., i1b) and i2 can be equal to or substantially equal to 180 degrees. Similarly, electrical current i3 can be out-of-phase with i1. For example, a phase difference between i1 (e.g., i1b) and i3 can be equal to or substantially equal to 180 degrees.

It should be noted that a reduction in i1b in connecting conduit 32 may be accomplished with an electrical biasing current (e.g., i2 and/or i3) comprising a phase difference with an absolute value that is other than 180 degrees out-of-phase with i1, since it is sufficient that the magnitude of the resultant electrical current in the precious metal component be reduced below a threshold for significant electrochemical activity. That is, i2 and/or i3 can be configured to cancel at least a portion of the electrical current i1b in the precious metal component, e.g., connecting conduit 32. For example, in some embodiments an absolute value of the phase difference between i2 and i1b can be in a range from about 90 degrees to about 180 degrees, such as in a range from about 100 degrees to about 180 degrees, from about 110 degrees to about 180 degrees, from about 120 degrees to about 180 degrees, from about 130 degrees to about 180 degrees, from about 140 degrees to about 150 degrees, from about 150 degrees to about 180 degrees, from about 160 degrees to about 180 degrees, or from about 170 degrees to about 180 degrees, including all ranges and subranges therebetween.

Similarly, an absolute value of the phase difference between i3 and i1b can be in a range from about 90 degrees to about 180 degrees, such as in a range from about 100 degrees to about 180 degrees, from about 110 degrees to about 180 degrees, from about 120 degrees to about 180 degrees, from about 130 degrees to about 180 degrees, from about 140 degrees to about 150 degrees, from about 150 degrees to about 180 degrees, from about 160 degrees to about 180 degrees, or from about 170 degrees to about 180 degrees, including all ranges and subranges therebetween.

As before, a magnitude of i2 can be equal to or substantially equal to a magnitude of i1 (e.g., i1b). Similarly, a magnitude of i3 can be equal to or substantially equal to a magnitude of it (e.g., i1b). However, in some embodiments, i2 and/or i3 need not be equal to or substantially equal to i1b if electrical current i2 and/or i3 extending through the precious metal component, e.g., connecting conduit 32, reduces i1b below a threshold at which significant electrochemical attack occurs. For example, in some embodiments, a magnitude of i2 and/or i3 can be in a range from about 50% of i1b to about 100% of i1b in connecting conduit 32, such as in a range from about 50% to about 95%, in a range from about 50% to about 90%, in a range from about 50% to about 85%, in a range from about 50% to about 80%, in a range from about 50% to about 70%, or in a range from about 50% to about 60%. In still other embodiments, a magnitude of i2 and/or i3 can be in a range from about 60% to about 100% of i1b, for example in a range from about 70% to about 100%, in a range from about 80% to about 100%, in a range from about 85% to about 100%, in a range from about 90% to about 100%, or in a range from about 95% to about 100%.

Figure 11:
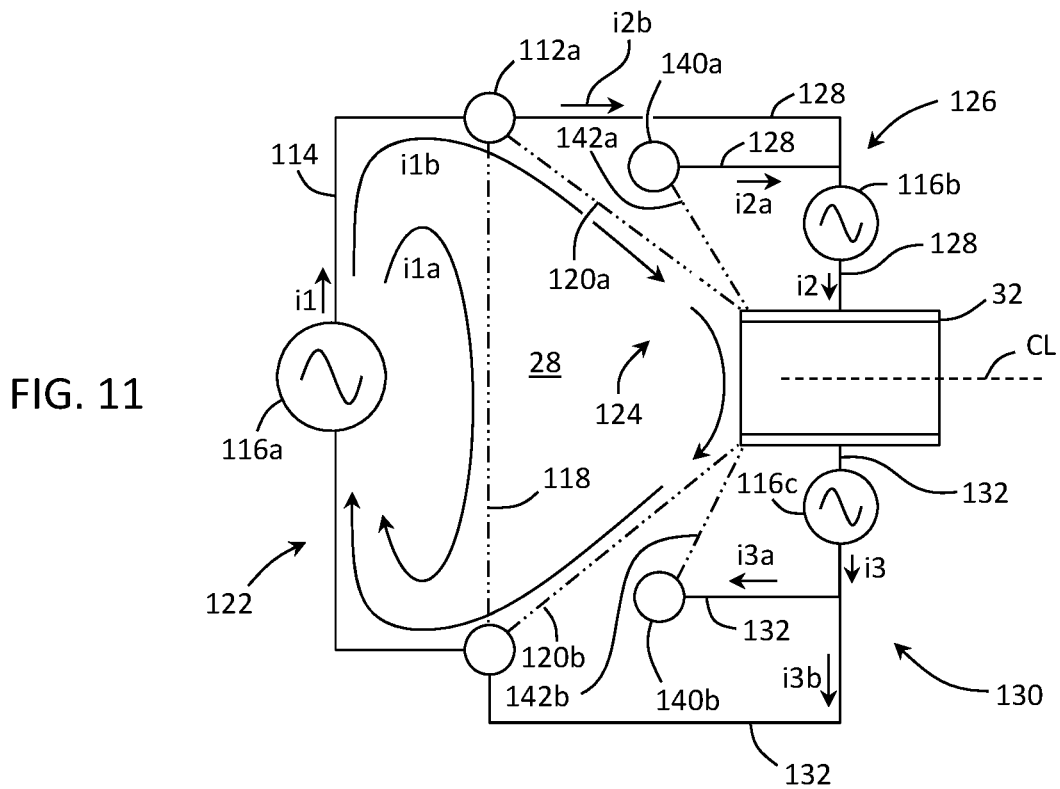
FIG. 11 is an electrical schematic illustrating another alternative embodiment wherein second and third alternating current electrical power sources are electrically connected to first and second electrodes and first and second auxiliary electrodes, respectively.

In still further embodiments, shown in FIG. 11, second alternating current electrical power source 116b can be electrically connected between connecting conduit 32 and both first electrode 112a and first auxiliary electrode 140a, such as by one or more electrical conductors 128, wherein first electrical biasing circuit 126 can comprise second alternating current electrical power source 116b, first electrode 112a, first auxiliary electrode 140a, connecting conduit 32, electrical current paths 120a and 142a, and one or more electrical conductors 128 electrically connecting first electrode 112a and first auxiliary electrode 140a to second alternating current electrical power source 116b, and second alternating current electrical power source 116b to connecting conduit 32. In this instance, i2 can be split into i2a and i2b in the two circuit legs extending between second alternating current electrical power source 116b and first electrode 112a and first auxiliary electrode 140a.

In addition, third alternating current electrical power source 116c can be electrically connected between connecting conduit 32 and both second electrode 112b and second auxiliary electrode 140b, such as by one or more electrical conductors 132, wherein second electrical biasing circuit 130 comprises second auxiliary electrode 140b, connecting conduit 32, electrical current paths 120b and 142b extending through molten glass 28 between second electrode 112b and second auxiliary electrode 140b, respectively, connecting conduit 32, and one or more electrical conductors 132 electrically connecting second auxiliary electrode 140b and second electrode 112b to third alternating current electrical power source 116c and third alternating current electrical power source 116c to connecting conduit 32. In this instance, i3 can be split into i3a and i3b in the two circuit legs extending between third alternating current electrical power source 116c and second electrode 112b and second auxiliary electrode 140b.

While the foregoing discussion used a fusion downdraw glass making apparatus and process, including a refractory melting vessel, to illustrate aspects of the disclosure, in further embodiments, the glass making apparatus may include other glass making processes, such as slot draw, float, press, tube drawing, and other refractory vessels. For example, melting furnace 12 may comprise a refractory forehearth located downstream from melting vessel 14, wherein molten glass from melting vessel 14 is directed to the forehearth for thermal conditioning by a Joule heating system in a manner similar to melting vessel 14. Similar to melting vessel 14, the refractory forehearth may include a plurality of electrodes connected to an AC electrical power source for heating molten glass in the forehearth. Accordingly, the forehearth may include one or more electrical biasing circuits as described in reference to melting vessel 14.

In still other embodiments, the refractory vessel may comprise a refractory fining vessel provided with electrodes, alternating current electrical power supplies, and electrical biasing circuits for Joule heating molten glass in the refractory fining vessel as described above in reference to melting vessel 14.

While the foregoing descriptions focused on first connecting conduit 32, it should be apparent that the principles described herein can be applied to other precious metal components located in a refractory vessel containing molten glass heated by an electrical current passing through the molten glass.

It will be apparent to those skilled in the art that various modifications and variations can be made to embodiments of the present disclosure without departing from the spirit and scope of the disclosure. Thus, it is intended that the present disclosure cover such modifications and variations provided they come within the scope of the appended claims and their equivalents.

What is claimed is:

1. An apparatus for forming a glass article, comprising:
   a refractory vessel defining an interior space configured to hold molten glass;
   a precious metal component exposed to the interior space and arranged to contact the molten glass;
   a first alternating current electrical power source electrically connected between first and second electrodes exposed to the interior space and arranged to contact the molten glass, the first alternating current electrical power source configured to supply a first electrical current;
   a second alternating current electrical power source electrically connected between the precious metal component and at least one of the first electrode or a first auxiliary electrode arranged to contact the molten glass, the second electrical power source configured to supply a second electrical current out-of-phase with the first electrical current; and
   a third alternating current electrical power source electrically connected between the precious metal component and at least one of the second electrode or a second auxiliary electrode arranged to contact the molten glass, the second electrical power source configured to supply a third electrical current out-of-phase with the first electrical current.

2. The apparatus according to claim 1, wherein the first alternating current electrical power source, the first electrode, and the second electrode comprise a first electrical circuit.

3. The apparatus according to claim 2, wherein the second alternating current electrical power source, the precious metal component, and the at least one of the first electrode or the first auxiliary electrode comprise a first electrical biasing circuit.

4. The apparatus according to claim 3, wherein the third alternating current electrical power source, the precious metal component, and the at least one of the second electrode or the second auxiliary electrode comprise a second electrical biasing circuit.

5. The apparatus according to claim 1, wherein the refractory vessel comprises at least one of a melting vessel, a fining vessel, or a forehearth.

6. The apparatus according to claim 1, wherein the first and second electrodes comprise tin or molybdenum.

7. The apparatus according to claim 1, wherein the first auxiliary electrode comprises tin or molybdenum.

8. The apparatus according to claim 1, wherein the second auxiliary electrode comprises tin or molybdenum.

9. The apparatus according to claim 1, wherein the second alternating current electrical power source is configured such that an absolute value of a phase difference between the first electrical current and the second electrical current is in a range from about 90 degrees to about 180 degrees.

10. The apparatus according to claim 1, wherein the third alternating current electrical power source is configured such that an absolute value of a phase difference between the first electrical current and the third electrical current is in a range from about 90 degrees to about 180 degrees.

11. A method for forming a glass article, comprising:
supplying a first electrical current from a first alternating current electrical power source, a first portion of the first electrical current extending along a first electrical current path between a first electrode and a second electrode in a melting space of a melting vessel, the melting space comprising molten glass and a precious metal component in contact with the molten glass, the first electrical current path extending through the molten glass and not the precious metal component, and a second portion of the first electrical current extending along a second electrical current path between the first electrode and the second electrode in the melting space of the melting vessel, the second electrical current path extending through the molten glass and the precious metal component;
supplying a second electrical current out of phase with the first electrical current from a second alternating current electrical power source, the second electrical current extending between at least one of the first electrode or a first auxiliary electrode in contact with the molten glass and spaced apart from the first electrode, and the precious metal component; and
supplying a third electrical current out of phase with the first electrical current from a third alternating current electrical power source, the third electrical current extending between at least one of the second electrode or a second auxiliary electrode in contact with the molten glass and spaced apart from the second electrode, and the precious metal component.

12. The method according to claim 11, wherein an absolute value of a phase difference between the first electrical current and the second electrical current is in a range from about 90 degrees to about 180 degrees.

13. The method according to claim 11, wherein an absolute value of a phase difference between the first electrical current and the third electrical current is in a range from about 90 degrees to about 180 degrees.

14. The method according to claim 11, wherein the second electrical current is in-phase with the third electrical current.

15. The method according to claim 11, wherein a magnitude of the second electrical current in the precious metal component is in a range from about 50% to about 100% of a magnitude of the second portion of the first electrical current in the precious metal component.

16. The method according to claim 11, wherein a magnitude of the third electrical current in the precious metal component is in a range from about 50% to about 100% of a magnitude of the second portion of the first electrical current in the precious metal component.

17. The method according to claim 11, wherein a magnitude of the second electrical current in the precious metal component is substantially equal to a magnitude of the third electrical current in the precious metal component.

18. The method according to claim 11, wherein the precious metal component comprises platinum.

19. The method according to claim 11, wherein the precious metal component comprises at least one of a thermocouple, a bubbler tube, or a conduit configured as a flow path for the molten glass.

20. The method according to claim 11, further comprising drawing the molten glass from a forming body to produce the glass article.

* * * * *